United States Patent
Horiuchi

(10) Patent No.: US 9,267,528 B2
(45) Date of Patent: Feb. 23, 2016

(54) TAPPING SCREW

(71) Applicant: TOPURA CO., LTD., Hadano-shi, Kanagawa (JP)

(72) Inventor: Naoki Horiuchi, Hadano (JP)

(73) Assignee: TOPURA CO., LTD. (JP)

( * ) Notice: Subject to any disclaimer, the term of this patent is extended or adjusted under 35 U.S.C. 154(b) by 0 days.

(21) Appl. No.: 14/410,823

(22) PCT Filed: Jun. 26, 2013

(86) PCT No.: PCT/JP2013/067464
§ 371 (c)(1),
(2) Date: Dec. 23, 2014

(87) PCT Pub. No.: WO2014/003041
PCT Pub. Date: Jan. 3, 2014

(65) Prior Publication Data
US 2015/0198196 A1  Jul. 16, 2015

(30) Foreign Application Priority Data

Jun. 26, 2012 (JP) .................................. 2012-142824

(51) Int. Cl.
*F16B 25/00* (2006.01)
*F16B 35/04* (2006.01)

(52) U.S. Cl.
CPC ............. *F16B 35/04* (2013.01); *F16B 25/0021* (2013.01); *F16B 25/0068* (2013.01); *F16B 25/0084* (2013.01)

(58) Field of Classification Search
CPC .. F16B 25/00; F16B 25/0021; F16B 25/0036; F16B 25/0042; F16B 25/0078; F16B 35/04; F16B 35/047; F16B 35/065; F16B 25/0047

USPC ........... 411/386, 387.4, 387.5, 411, 412, 413, 411/415
See application file for complete search history.

(56) References Cited

U.S. PATENT DOCUMENTS 3,703,843 A * 11/1972 Laverty .................. 411/413
RE28,111 E * 8/1974 Laverty .................. 411/412
3,861,269 A   1/1975 Laverty (Continued)

FOREIGN PATENT DOCUMENTS

EP  2065888 A1  6/2009
EP  2077396 A1  7/2009

(Continued)

*Primary Examiner* — Roberta Delisle
(74) *Attorney, Agent, or Firm* — Harness, Dickey & Pierce, P.L.C.

(57) ABSTRACT

A tapping screw provides sufficient tightening force even if used with a thin screwed member and tightening target member. The tapping screw (100) includes a first ridge (11) and a second ridge (12) configured to have incomplete threads that are 180° out of phase. The tapping screw (100) includes a first tightening force improvement ridge (13) and a second tightening force improvement ridge (14) that are set so as to be smaller than the outside diameters of complete thread sections of parallel threaded portions of the first ridge (11) and the second ridge (12) but larger than the inside diameter of the prepared hole are provided in each of areas which are 90° out of phase with the first ridge (11) and the second ridge (12), respectively, such that the tightening force improvement ridges bite into the prepared hole when the screw is fully screwed in.

4 Claims, 15 Drawing Sheets

(56) References Cited

U.S. PATENT DOCUMENTS

| | | | |
|---|---|---|---|
| 3,978,760 A * | 9/1976 | Muenchinger | 411/386 |
| 4,261,402 A * | 4/1981 | Stanaitis | 411/107 |
| 4,329,099 A * | 5/1982 | Shimizu et al. | 411/412 |
| 4,693,654 A * | 9/1987 | Bettini | 411/387.4 |
| 5,242,253 A * | 9/1993 | Fulmer | 411/386 |
| 5,294,227 A * | 3/1994 | Forster et al. | 411/386 |
| 6,045,312 A * | 4/2000 | Hsing | 411/412 |
| 6,077,013 A * | 6/2000 | Yamamoto et al. | 411/386 |
| 6,158,938 A * | 12/2000 | Savoji | 411/386 |
| 6,494,655 B1 | 12/2002 | Pritchard | |
| 6,494,656 B1 | 12/2002 | Boyer et al. | |
| 6,712,708 B2 | 3/2004 | Boyer et al. | |
| 6,945,729 B2 * | 9/2005 | Yasuda | 403/408.1 |
| 7,101,134 B2 * | 9/2006 | LeVey et al. | 411/411 |
| 7,214,020 B2 * | 5/2007 | Suzuki | 411/417 |
| 2003/0049095 A1 | 3/2003 | Boyer et al. | |
| 2007/0217887 A1 * | 9/2007 | Lin | 411/413 |
| 2008/0232926 A1 * | 9/2008 | Hsu | 411/412 |
| 2009/0010734 A1 * | 1/2009 | Lin | 411/413 |
| 2009/0053008 A1 | 2/2009 | Yamaki | |
| 2010/0047035 A1 * | 2/2010 | Rosenkranz et al. | 411/387.4 |

FOREIGN PATENT DOCUMENTS

| | | |
|---|---|---|
| JP | 60-169415 | 11/1985 |
| JP | 08-226424 | 9/1996 |
| JP | 10-131932 | 5/1998 |
| JP | 2001-107932 A | 4/2001 |
| JP | 2002-089526 A | 3/2002 |
| JP | 2005-180475 A | 7/2005 |
| JP | 2006-329254 A | 12/2006 |
| JP | 4260624 B2 | 4/2009 |
| JP | 2009-150534 A | 7/2009 |
| JP | 2009-191930 A | 8/2009 |
| JP | 4480395 B2 | 6/2010 |
| JP | 2010-185498 A | 8/2010 |
| JP | 2010-190234 A | 9/2010 |
| JP | 2011-106578 A | 6/2011 |
| WO | 2006129382 A1 | 12/2006 |

* cited by examiner

TAPPING SCREW

CROSS-REFERENCE TO RELATED APPLICATIONS

This application is a National Stage of International Application No. PCT/JP2013/067464, filed Jun. 26, 2013, which claims priority to Japanese Patent Application No. 2012-142824, filed Jun. 26, 2012. The entire disclosures of each of the above applications are incorporated herein by reference.

FIELD

The present disclosure relates to a tapping screw that can be suitably used for steel sheets.

BACKGROUND

For common tapping screws, appropriate tightening may fail to be performed on steel sheets with a sheet thickness of less than 1 mm. The reason for the failure will be explained with reference to FIGS. 11 to 15. FIG. 11 is a front view of a tapping screw according to a conventional example. FIG. 12 is a CC cross-sectional view in FIG. 11. FIGS. 13 to 15 are diagrams depicting how the tapping screw according to the conventional example is tightened.

A tapping screw 500 includes a threaded shank 510 and a head 520. In general, single-start thread is formed on the shank 510 of the tapping screw 500. As depicted in the cross-sectional view in FIG. 12, the cross-sectional shape of the tapping screw 500 is a noncircular cross section resulting from composition of a circle of the ridge and a circle of a root. In FIG. 12, a solid line V corresponds to a root diameter, and a solid line S corresponds to an external shape of the external thread. When the thus configured tapping screw 500 is used to, for example, fix two sheet-like members (fix a tightening target member to a screwed member), a prepared hole is preformed in the screwed member, and an insertion hole is preformed in the tightening target member. Then, the tapping screw is driven into the prepared hole in the screwed member via the insertion hole formed in the tightening target member side to allow the two members to be fixed. In this case, when the thickness of the screwed member is sufficient, even if the cross section of the shank 510 is a noncircular cross section, an area of the ridge which is equal to or larger than one circumference advances in a continuous spiral manner while in contact with the prepared hole to form an internal thread. Thus, the shank 510 is driven while remaining perpendicular to the two members.

In this regard, a case will be described where the tapping screw 500 configured as described above is assumed to be used when a second steel sheet 300 is fixed to a first steel sheet 200 with a small sheet thickness as depicted in FIGS. 13 to 15. A prepared hole 210 is preformed in the first steel sheet 200. An insertion hole 310 through which the shank 510 of the tapping screw 500 is inserted is preformed in the second steel sheet 300. Since the first steel sheet 200 is thin (for example, approximately 0.4 mm), the area in which the ridge formed on the shank 510 of the tapping screw 500 contacts the prepared hole 210 is smaller than one circumference. Consequently, the length of the spiral internal thread formed is, for example, approximately half a circumference. Thus, as described above, since the cross section of the shank 510 is a noncircular cross section, the shank 510 is obliquely tilted while being driven into the first steel sheet 200 and the second steel sheet 300. Furthermore, when a bearing surface 521 of the head 520 comes into abutting contact with the second steel sheet 300, the ridge also contacts the prepared hole 210 along approximately half a circumference. Not only is the tapping screw 500 tilted but also a sufficient tightening force is not obtained.

Furthermore, in general, a threaded portion near and below a neck of an external threaded fastener is referred to as an incomplete thread, which has an incomplete thread shape. When two steel sheets each with a small sheet thickness are tightened together as described above, the incomplete thread may be fitted into an internal threaded portion formed. In this case, the strength of a portion of fitting between the fitting portion between the external threaded portion and the internal threaded portion with respect to an axial load decreases significantly. In connection with this, workability at the time of tightening may be degraded, and the internal threaded portion may be destroyed even with a relatively weak external force. Additionally, the tapping screw may be loosened.

As described above, conventionally, when the screwed member and the tightening target member are thin like steel sheets, directly using the tapping screw 500 is impossible. Thus, for example, fixation is performed using a bolt and a nut, or steel sheets are burred to increase the number of threads formed by the external thread before the tapping screw is used.

A tightening method using a bolt and a nut increases the number of components, and a method of burring steel sheets increases the number of processing operations and needs a complicated mold. Thus, costs increase in both cases. Furthermore, conventionally, burring of steel sheets disadvantageously involves a failure to achieve a sufficient height of burring. Consequently, there has been a desire for a tapping screw that can be used for a thin screwed member and a thin tightening target member without the need, for example, to burr the members.

Patent Document 1: Japanese Patent Application Laid-open No. 2009-150534
Patent Document 2: Japanese Patent Application Laid-open No. H10-131932
Patent Document 3: Japanese Patent No. 4260624
Patent Document 4: Japanese Patent No. 4480395

SUMMARY

An object of the present disclosure is to provide a tapping screw that allows a sufficient tightening force to be exerted even when a screwed member and a tightening target member are thin.

The present disclosure has adopted the following means to solve the above-described problems.

That is, the tapping screw according to the present disclosure is: a tapping screw including a double-start thread configured to include incomplete threads that are 180° out of phase with each other, the tapping screw being driven into a prepared hole preformed in a screwed member to tighten a tightening target member to the screwed member, in which a tightening force improvement ridge which is set to be smaller than an outer diameter of a complete thread of a parallel threaded portion of each of two ridges of the double-start thread and larger than an inner diameter of the prepared hole is provided in each of areas which are 90° out of phase with the respective two ridges of the double-start thread and which are pushed into the prepared hole when tightening is complete.

According to the present disclosure, even if the screwed member and the tightening target member are thin, when tightening is complete, the two ridges and two tightening force improvement ridges are driven into the prepared hole formed in the screwed member at a total of four positions. The ridges or the tightening force improvement ridges are driven into the prepared hole at internals of 90° in a circumferential direction. Thus, a sufficient tightening force can be exerted.

Furthermore, a tilt prevention projecting portion set to be smaller than the inner diameter of the prepared hole may be provided in each of areas that are 90° out of phase with respect to two positions of the two ridges which serve as cutting portions when the tapping screw is driven into the prepared hole.

Thus, when a shank is driven into the prepared hole, an internal thread is formed at positions that are 180° out of phase with each other by the respective cutting portions. Furthermore, since the tilt prevention projecting portions are provided in the areas that are 90° out of phase with respect to the two positions serving as the cutting portions, the shank is inhibited (prevented) from being tilted.

A lead of one ridge of the two threads may be set to be equal to or larger than a sheet thickness of the screwed member.

This allows an internal thread defined by a first ridge and an internal thread defined by a second ridge to be inhibited (prevented) from interfering with each other.

The above-described configurations may be adopted by being combined together whenever possible.

As described above, the present disclosure enables a sufficient tightening force to be exerted even when the screwed member and the tightening target member are thin.

DRAWINGS

DETAILED DESCRIPTION

Figure 1:
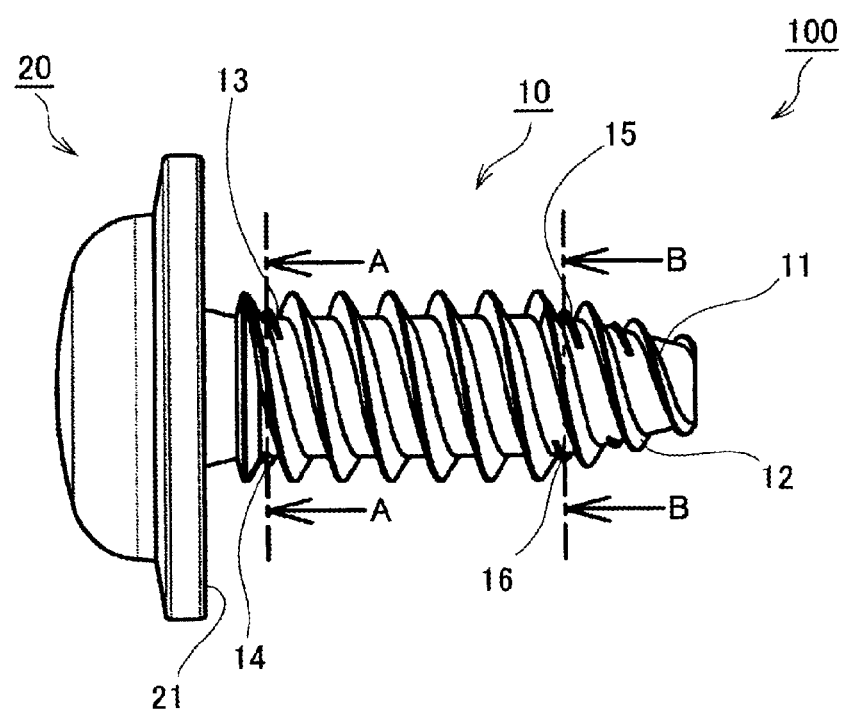
FIG. 1 is a front view of a tapping screw according to an embodiment of the present disclosure.

With reference to the drawings, a mode for carrying out the present disclosure will be described below in detail in an illustrative manner based on an embodiment. The dimensions, materials, shapes, relative dispositions, and the like of components described in the embodiment are not intended to limit the scope of the disclosure to these dimensions, materials, shapes, relative dispositions, and the like unless otherwise specified.

(Embodiment)

A tapping screw according to an embodiment of the present disclosure will be described with reference to FIGS. 1 to 10.

<Configuration of the Tapping Screw>

A configuration of the tapping screw according to the present disclosure will be described with particular reference to FIG. 1 and FIG. 2. A tapping screw 100 according to the present embodiment includes a shank 10 and a head 20. Two ridges of the double-start thread are formed on the shank 10. The two ridges are the same both in ridge height and in ridge shape. For convenience of description, the two ridges are hereinafter referred to as a first ridge 11 and a second ridge 12, respectively. An incomplete thread 11a of the first ridge 11 and an incomplete thread 12a of the second ridge 12 are 180° out of phase with each other. Furthermore, in the present embodiment, the lead of the first ridge 11 and the second ridge 12 is set to be equal to or larger than the sheet thickness (in this case, 2.0 mm or more) of a screwed member so as to prevent interference from an internal thread formed in a prepared hole defined by the ridges.

Furthermore, the shapes of the ridges are asymmetric ridge shapes for which the angle of a pressure side flank face is set to be half the angle of a play side flank face and for which an thread angle is 45°. Thus, excellent characteristics can be achieved in inhibition of loosening and in a tightening holding force. That is, the angle of the pressure side flank face is set to be half the angle of the play side flank face so as to inhibit stress applied in a direction in which an internal thread formed while a load is applied expands in the direction of the outer diameter of an external thread. Furthermore, when the angle is set be smaller than the thread angle of a normal JIS tapping screw, that is, 60°, the ridge height can be set to a large value even with the same lead. This also allows the percentage of thread engagement, which is particularly important for thin plates, to be set to a large value and allows the inner diameter of the prepared hole to be set to a small value without interference from a root of the thread.

In the tapping screw 100 according to the present embodiment, a first tightening force improvement ridge 13 and a second tightening force improvement ridge 14 are provided near and below a neck of the shank 10. Furthermore, a first tilt prevention projecting portion 15 and a second tilt prevention projecting portion 16 are provided near a leading end of the shank 10.

<Tightening Force Improvement Ridges>

Figure 3:
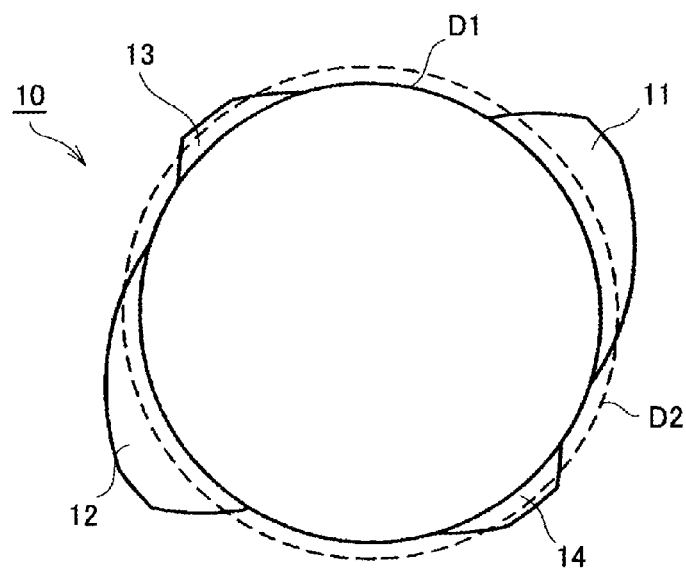
FIG. 3 is an AA cross-sectional view in FIG. 1.
Figure 4:
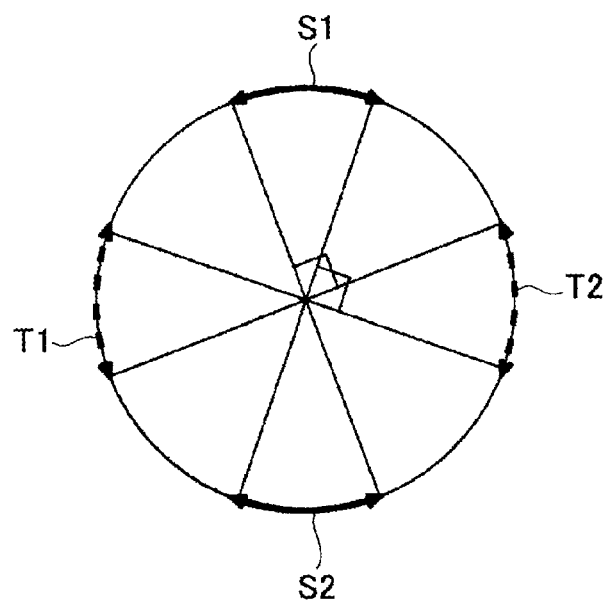
FIG. 4 is a diagram illustrating disposition of tightening force improvement ridges on the tapping screw according to the embodiment of the present disclosure.

With particular reference to FIG. 3 and FIG. 4, the tightening force improvement ridges (first tightening force improvement ridge 13 and second tightening force improvement ridge 14) will be described in detail.

Figure 2:
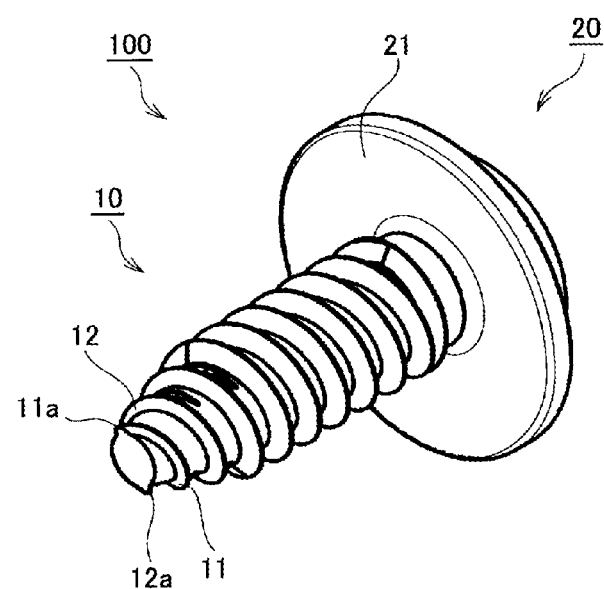
FIG. 2 is a perspective view of the tapping screw according to the embodiment of the present disclosure.

FIG. 3 is an AA cross-sectional view in FIG. 1. In FIG. 3, a solid line D1 corresponds to the root diameter of the shank 10. A dotted line D2 corresponds to the inner diameter of the prepared hole formed in the screwed member (first steel sheet 200 described below) into which the tapping screw 100 according to the present embodiment is driven. Furthermore, for the first ridge 11 and the second ridge 12, the external shape of a parallel threaded portion (complete thread) is depicted. As seen in this figure, the first tightening force improvement ridge 13 and the second tightening force improvement ridge 14 are set to be smaller than the outer diameter of the complete thread of the parallel threaded portion of the first ridge 11 and the second ridge 12 and to be larger than the inner diameter (dotted line D2) of the prepared hole. However, the height of the first tightening force improvement ridge 13 and the second tightening force improvement ridge 14 is desirably set to be equal to or lower than 60% of the ridge height of the parallel threaded portion of the first ridge 11 and the second ridge 12 so as to prevent an excessively high torque from being exerted during driving immediately before the tapping screw is seated during tightening.

Furthermore, the first tightening force improvement ridge 13 and the second tightening force improvement ridge 14 are provided in areas which are 90° out of phase with respect to the first ridge 11 and the second ridge 12, respectively, and which are pushed into the prepared hole in a tightened state.

This will be more specifically described. In an AA cross section perpendicular to the axis, ranges over which the first ridge 11 and the second ridge 12 may be present are defined as S1 and S2 in FIG. 4 with dimensional errors taken into account. Since the incomplete thread 11a of the first ridge 12 and the incomplete thread 12a of the second ridge 12 are 180° out of phase with each other, the range S1 and the range S2 are in a symmetric relation with respect to a central point. The first tightening force improvement ridge 13 and the second tightening force improvement ridge 14 are provided so as to include ranges T1 and T2, respectively, from a position that is 90° out of phase with respect to one end of the ranges S1, S2 to a position that is 90° out of phase with respect to the other end. Thus, the first tightening force improvement ridge 13 and the second tightening force improvement ridge 14 are provided in areas that are 90° out of phase with respect to the first ridge 11 and the second ridge 12, respectively.

Furthermore, to allow the first tightening force improvement ridge 13 and the second tightening force improvement ridge 14 to be provided in the areas that are pushed into the prepared hole in the tightened state, a distance from a bearing surface 21 of the head 20 may be set based on the thicknesses of two members to be fixed to each other (first steel sheet 200 and second steel sheet 300 described below). Additionally, explanation is provided about consideration on to what extent the first tightening force improvement ridge 13 and the second tightening force improvement ridge 14 are to be provided over an angle X present on a circumference of the tapping screw when the tapping screw the first tightening force improvement ridge 13 and the second tightening force improvement ridge 14 are pushed into the prepared hole over the entire area thereof in an axial direction (thickness direction). For example, the lead (corresponding to the distance that one ridge advances when rotating through 360°) of the first ridge 11 and the second ridge 12 is assumed to be 2.0 mm. In addition, the sheet thickness of the screwed member (first steel sheet 200 described below) is assumed to be 0.4 mm. Then, the distance is 2.0 mm for 360° and 0.4 mm for X, and thus, X=360°×(0.4 mm/2.0 mm)=72°. Therefore, in this case, when provided over a range of 72° or more, the first tightening force improvement ridge 13 and the second tightening force improvement ridge 14 can each be pushed into the prepared hole over the entire area thereof in the thickness direction.

<Tilt Prevention Projecting Portions>

Figure 5:
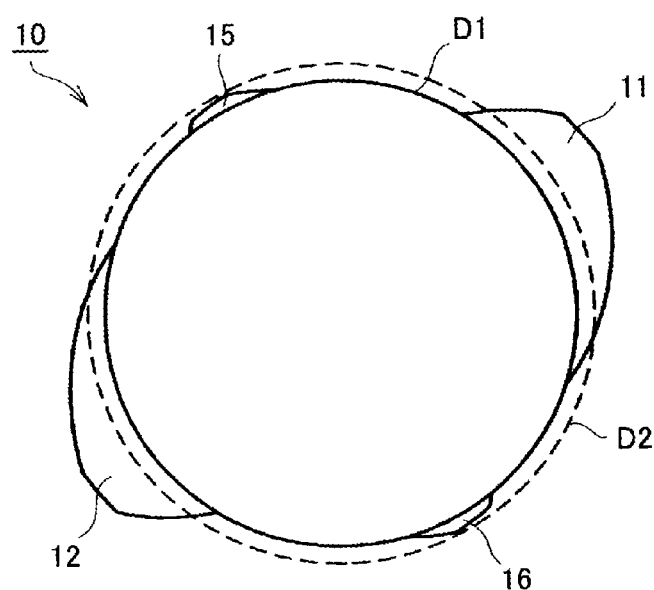
FIG. 5 is a BB cross-sectional view in FIG. 1.
Figure 6:
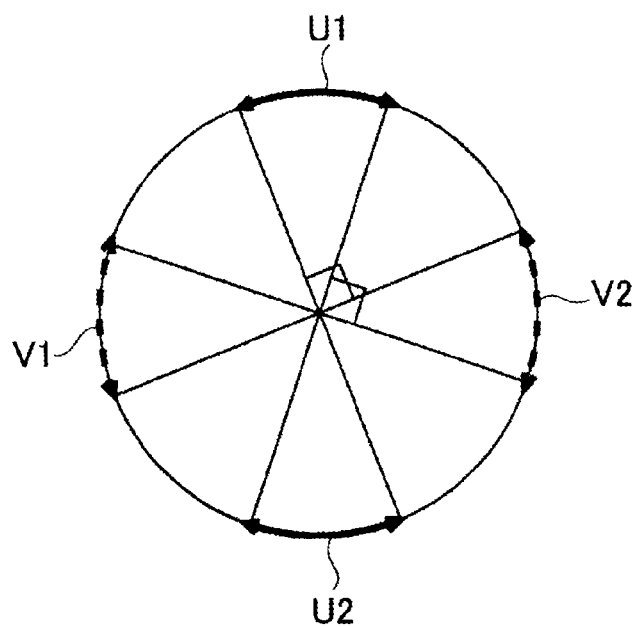
FIG. 6 is a diagram illustrating tilt prevention projecting portions on the tapping screw according to the embodiment of the present disclosure.

With particular reference to FIG. 5 and FIG. 6, the tilt prevention projecting portions (first tilt prevention projecting portion 15 and second tilt prevention projecting portion 16) will be described in detail.

FIG. 5 is a BB cross-sectional view of FIG. 1. In FIG. 5, a solid line D1 corresponds to the root diameter of the shank 10. A dotted line D2 corresponds to the inner diameter of the prepared hole formed in the screwed member (first steel sheet 200 described below) into which the tapping screw 100 according to the present embodiment is driven. Furthermore, for the first ridge 11 and the second ridge 12, the external shape of a parallel threaded portion (complete thread) is depicted. As seen in this figure, the first tilt prevention projecting portion 15 and the second tilt prevention projecting portion 16 are set to be smaller than the inner diameter of the prepared hole. To allow a tilt prevention function to be fully provided, the first tilt prevention projecting portion 15 and the second tilt prevention projecting portion 16 desirably have a height set to 15% or more of the height of the parallel threaded portion of the first ridge 11 and the second ridge 12. Additionally, in the present embodiment, a pair of tilt prevention projecting portions is defined as one set, and a total of two sets of the first tilt prevention projecting portion 15 and the second tilt prevention projecting portion 16 are provided. More specifically, one pair of the first tilt prevention projecting portion 15 and the second tilt prevention projecting portion 16 is provided at a position corresponding to the boundary between the parallel threaded portion and a tapered tread, and one pair of the first tilt prevention projecting portion 15 and the second tilt prevention projecting portion 16 is also provided at a position one pitch closer to the leading end of the tapping screw.

Furthermore, the first tilt prevention projecting portion 15 and the second tilt prevention projecting portion 16 are provided in areas that are 90° out of phase with respect to two positions of the first ridge 11 and the second ridge 12 which serve as cutting portions when the tapping screw is driven into the prepared hole.

This will be more specifically described. First, the leading end of the shank 10 provides a tapered thread and the diameter thereof increases from the leading end toward the head 20. Thus, the inner diameter of the prepared hole determines the two positions of the first ridge 11 and the second ridge 12 which serve as the cutting portions when the tapping screw is driven into the prepared hole. However, the two positions vary in accordance with the inner diameter of the prepared hole in the screwed member. Thus, in a cross section perpendicular to the axis, ranges that can serve as the cutting portions with the inner diameter taken into account are denoted by U1 and U2 in FIG. 6. Since the incomplete thread 11a of the first ridge 12 and the incomplete thread 12a of the second ridge 12 are 180° out of phase with each other, the range U1 and the range U2 are in a symmetric relation with respect to the central point. The first tilt prevention projecting portion 15 and the second tilt prevention projecting portion 16 are provided so as to include ranges V1 and V2, respectively, from a position that is 90° out of phase with respect to one end of the ranges U1, U2 to a position that is 90° out of phase with respect to the other end. If the nominal diameter of the screw is 4 mm, when the first tilt prevention projecting portion 15 and the second tilt prevention projecting portion 16 are each provided over a range of 110°, the prepared hole inner diameter within the range from approximately 2.9 mm to approximately 3.3 mm is applicable, which is an appropriate prepared hole range for the screw nominal diameter of 4 mm.

<Mechanism for Tightening>

With particular reference to FIGS. 7 to 10, a mechanism for tightening with the tapping screw according to the present embodiment will be described.

<<Start of Tightening>>

Figure 7:
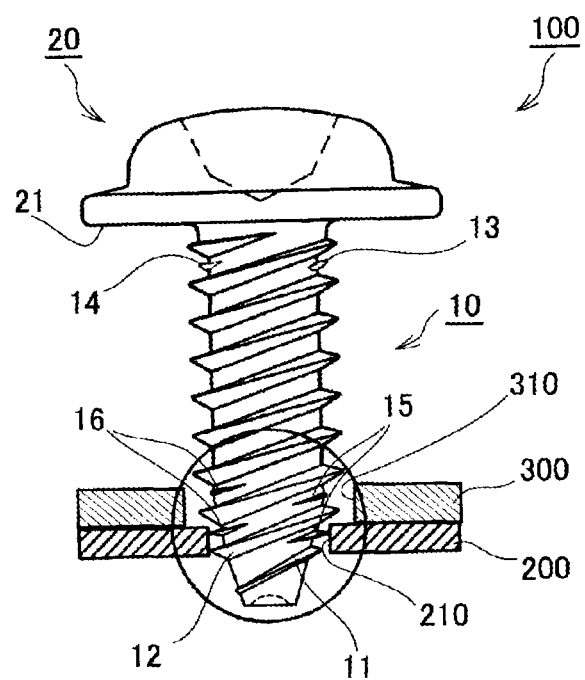
FIG. 7 is a diagram depicting how tightening is started with the tapping screw according to the embodiment of the present disclosure.
Figure 8:
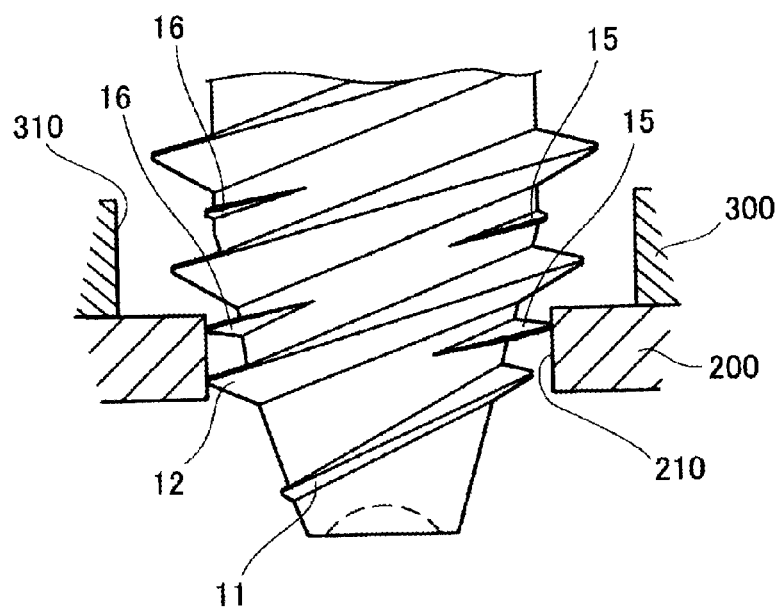
FIG. 8 is a partly enlarged diagram of FIG. 7.

FIG. 7 depicts how tightening with the tapping screw 100 according to the present embodiment is started. FIG. 8 is an enlarged diagram of the vicinity of an encircled area in FIG. 7. A case will be described below where the second steel sheet (tightening target member) 300 is fixed to the first steel sheet 200 with a small sheet thickness (screwed member). The sheet thickness of the first steel sheet 200 is, for example, 0.4 mm. A prepared hole 210 is preformed in the first steel sheet 200. An insertion hole 310 through which the shank 510 of the tapping screw 500 is inserted is preformed in the second steel sheet 300.

The shank 10 of the tapping screw 100 is inserted into the prepared hole 210 from the insertion hole 310 side with the second steel sheet 300 laid on top of the first steel sheet 200 so that the center of the prepared hole 210 aligns with the center of the insertion hole 310. Then, near a part of the tapered thread at the leading end of the shank 10 which part has the same diameter as the inner diameter of the prepared hole 210, the outer peripheral surfaces of the first ridge 11 and the second ridge 12 come into contact with an inner peripheral surface of the prepared hole 210 (as depicted in FIG. 7 and FIG. 8). The two contact portions serve as the above-described cutting portions. The two contact portions are in a 180°-out-of-phase positional relation.

Furthermore, as described above, the first tilt prevention projecting portion 15 and the second tilt prevention projecting portion 16 are provided in the areas that are 90° out of phase with respect to the positions of the two cutting portions. Thus, a tilt of the tapping screw 100 in the direction of the two cutting portions is inhibited by the cutting portions. A tilt of the tapping screw 100 in a direction perpendicular to the direction of the cutting portions is inhibited by the first tilt prevention projecting portion 15 and the second tilt prevention projecting portion 16.

In this state, as the tapping screw 100 is driven, internal thread with double start is formed in the inner peripheral surface of the prepared hole 210 in the first steel sheet 200 by the first ridge 11 and the second ridge 12. After the tapered thread passes through the prepared hole 210, the parallel threaded portion advances along the internal threads already formed.

<<Completion of Tightening>>

Figure 9:
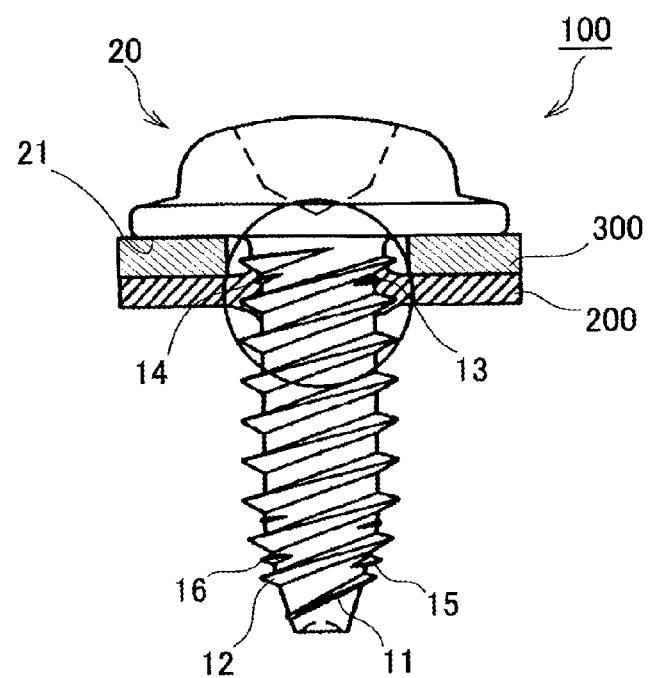
FIG. 9 is a diagram depicting how tightening is completed with the tapping screw according to the embodiment of the present disclosure.
Figure 10:
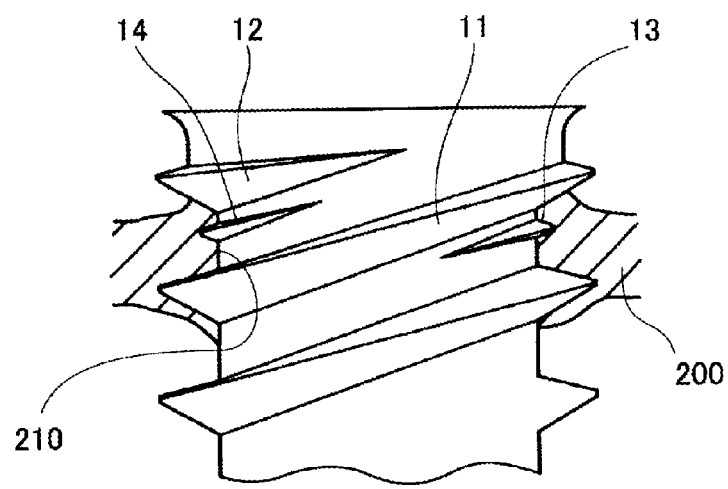
FIG. 10 is a partly enlarged diagram of FIG. 9.
Figure 11:
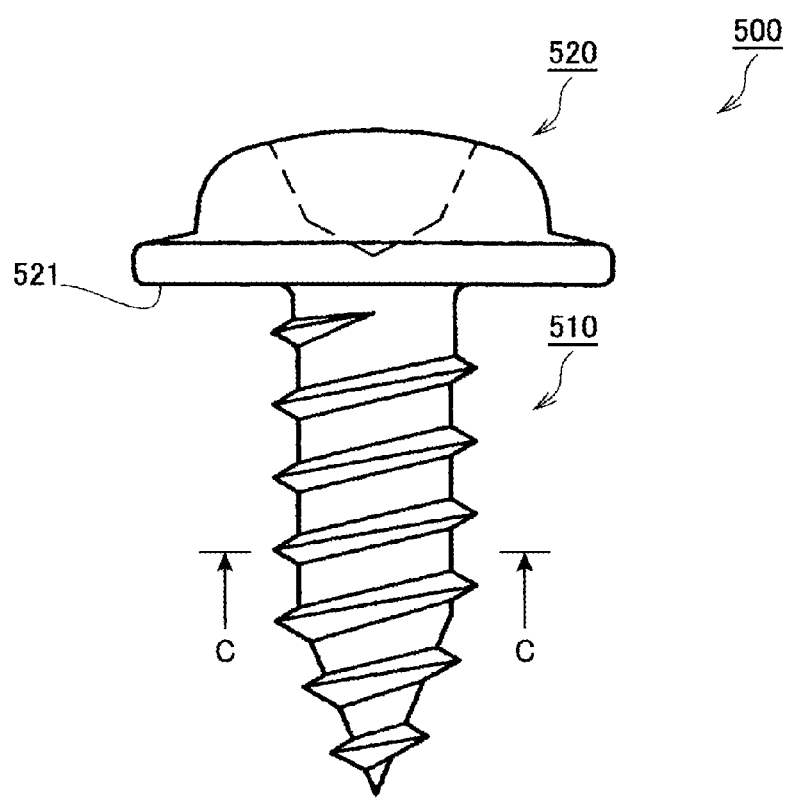
FIG. 11 is a front view of a tapping screw according to a conventional example.
Figure 12:
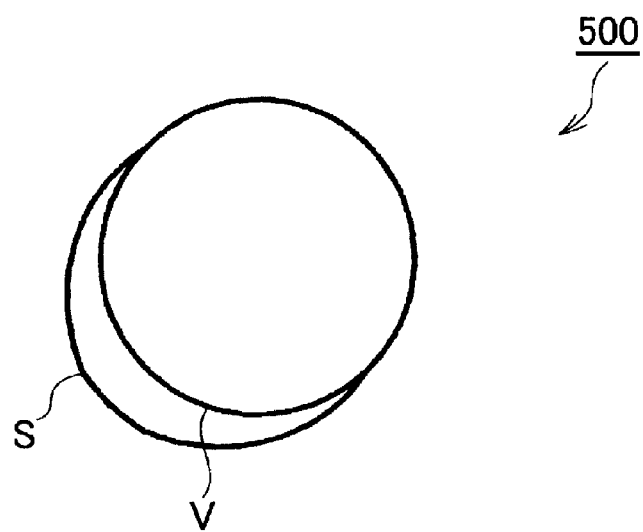
FIG. 12 is a CC cross-sectional view in FIG. 11.
Figure 13:
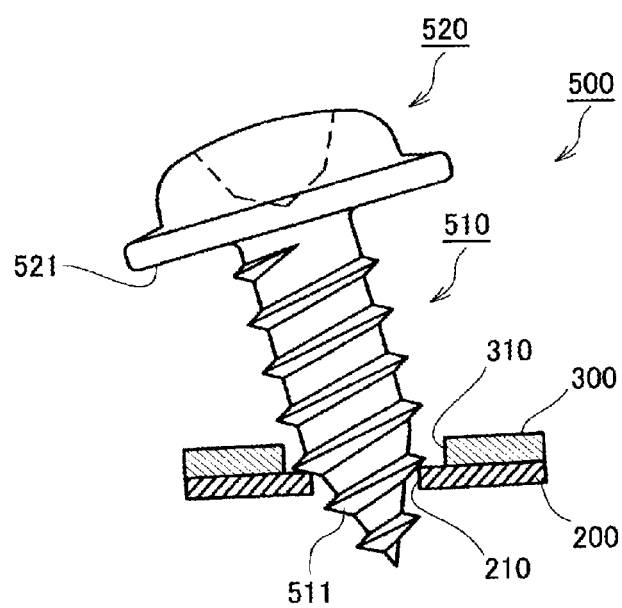
FIG. 13 is a diagram illustrating how tightening is performed with the tapping screw according to the conventional example.
Figure 14:
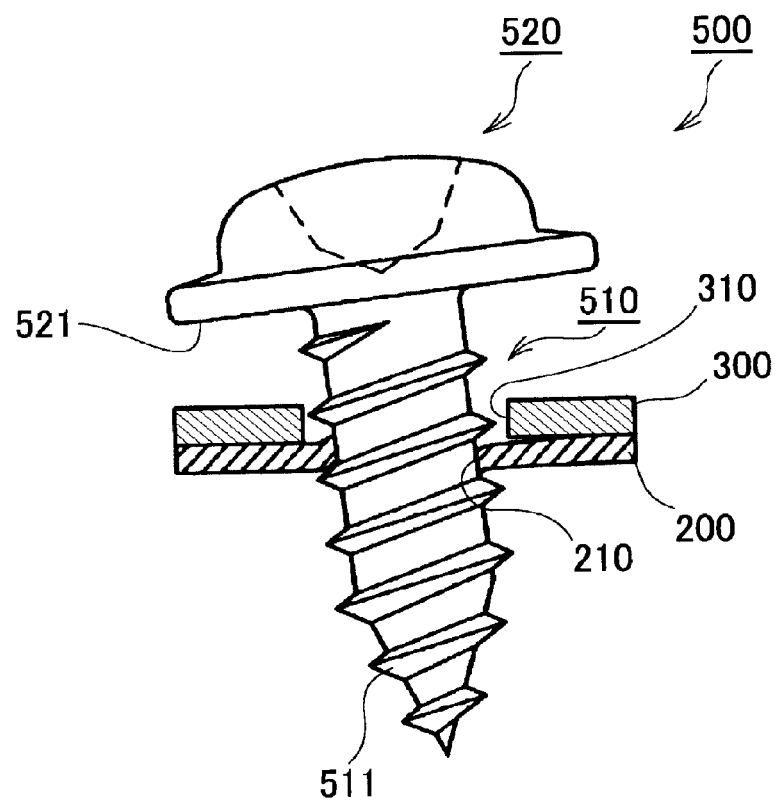
FIG. 14 is a diagram illustrating how tightening is performed with the tapping screw according to the conventional example.
Figure 15:
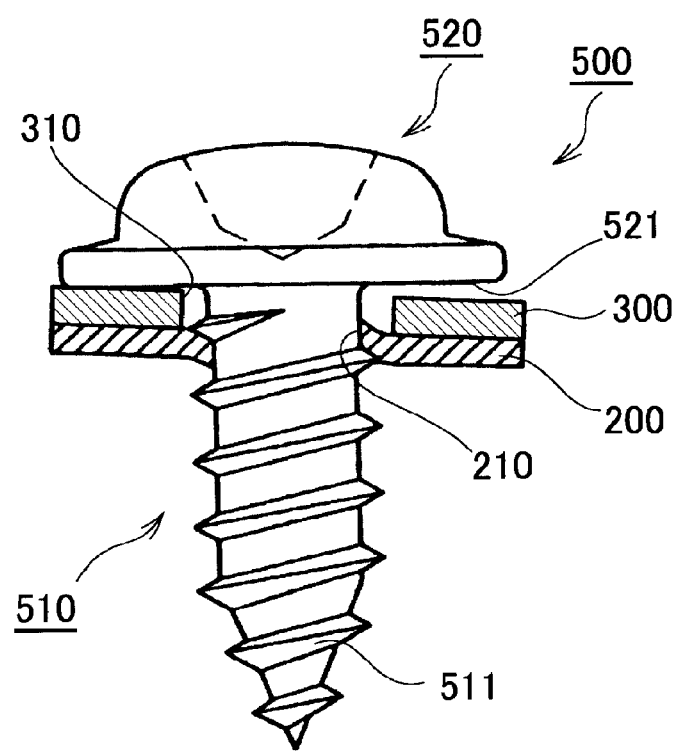
FIG. 15 is a diagram illustrating how tightening is performed with the tapping screw according to the conventional example.

FIG. 9 depicts how tightening is completed with the tapping screw 100 according to the present embodiment. FIG. 10 is an enlarged diagram of the vicinity of an encircled area in FIG. 9. When the driving of the tapping screw 100 proceeds to the vicinity of an area where the bearing surface 21 of the head 20 comes into contact with the second steel sheet 300, the outer peripheral surfaces of the first tightening force improvement ridge 13 and the second tightening force improvement ridge 14 come into contact with the inner peripheral surface of the prepared hole 210. As the driving of the tapping screw 100 further proceeds, internal threads are newly formed in the inner peripheral surface of the prepared hole 210 by the first tightening force improvement ridge 13 and the second tightening force improvement ridge 14. Since the first tightening force improvement ridge 13 and the second tightening force improvement ridge 14 are formed in the areas that are 90° out of phase with respect to the first ridge 11 and the second ridge 12, respectively, the internal threads are newly formed at positions that are out of phase with respect to the internal thread with double start already formed.

<Advantageous Points of the Tapping Screw According to the Present Embodiment>

The tapping screw 100 according to the present embodiment adopts the configuration including the double-start thread (first ridge 11 and second ridge 12) with the incomplete threads 11a, 12a that are 180° out of phase with each other. Thus, compared to a tapping screw with single-start thread, the tapping screw 100 can be restrained from being tilted during tightening.

Furthermore, with the tapping screw 100 according to the present embodiment, even when the first steel sheet 200 is thin, the first ridge 11 and the second ridge 12 and the first tightening force improvement ridge 13 and the second tightening force improvement ridge 14 are driven into the prepared hole 210 formed in the first steel sheet 200 at a total of four positions when the tightening is complete. These ridges are driven into the prepared hole 210 at intervals of 90° in the circumferential direction. Thus, a sufficient tightening force, a sufficient holding force, and a sufficient stripping torque (internal thread breaking force) can be exerted. Furthermore, in general, the ridge provided near and below the neck forms an incomplete thread, which reduces the tightening force and the like. However, the reduction can be compensated for by the first tightening force improvement ridge 13 and the second tightening force improvement ridge 14.

The first tightening force improvement ridge 13 and the second tightening force improvement ridge 14 have a smaller ridge height than the first ridge 11 and the second ridge 12. This enables inhibition of an excessive increase in driving torque.

Moreover, in the tapping screw 100 according to the present embodiment, the first tilt prevention projecting portion 15 and the second tilt prevention projecting portion 16 are provided in the areas that are 90° out of phase with respect to the two positions of the cutting portions. Thus, the shank 10 is inhibited (prevented) from being tilted immediately after the start of driving. That is, the tapping screw 100 according to the present embodiment adopts, as described above, the configuration including double-start thread and is thus less likely to be tilted compared to common single-start thread screws. However, this configuration is likely to be tilted in directions that are 90° out of phase with respect to the respective threads. In this regard, the tapping screw 100 according to the present embodiment is provided with the first tilt prevention projecting portion 15 and the second tilt prevention projecting portion 16 to inhibit a tilt in those directions. Consequently, a tilt of the tapping screw 100 can be effectively inhibited (in all directions). The first tilt prevention projecting portion 15 and the second tilt prevention projecting portion 16 are smaller than the inner diameter of the prepared hole 210 and thus do not form any internal thread in the prepared hole 210. The first tilt prevention projecting portion 15 and the second tilt prevention projecting portion 16 thus do not cause an increase in torque.

Furthermore, for both the first ridge 11 and the second ridge 12, the lead is set equal to or larger than the sheet thickness of the first steel sheet 200 (screwed member) according to the present embodiment. This allows an internal thread defined by the first ridge 11 and an internal thread defined by the second ridge 12 to be inhibited (prevented) from interfering with each other.

EXPLANATION OF REFERENCE NUMERALS

10 Shank
11 First ridge
12 Second ridge
13 First tightening force improvement ridge
14 Second tightening force improvement ridge
15 First tilt prevention projecting portion
16 Second tilt prevention projecting portion
20 Head
21 Bearing surface
200 First steel sheet
210 Prepared hole
300 Second steel sheet
310 Insertion hole

The invention claimed is:

1. A tapping screw comprising a double-start thread configured to have incomplete threads that are 180° out of phase with each other, the tapping screw being driven into a prepared hole preformed in a screwed member to tighten a tightening target member to the screwed member, wherein a pair of tightening force improvement ridges which are set to be smaller than an outer diameter of a complete thread of a parallel threaded portion of each of two ridges of the double-start thread and larger than an inner diameter of the prepared hole is provided in each of areas which are 90° out of phase with the respective two ridges of the double-start thread and which are located proximal to a head of the tapping screw so that they are pushed into the prepared hole when tightening is complete.

2. The tapping screw according to claim 1, wherein a tilt prevention projecting portion set to be smaller than the inner diameter of the prepared hole is provided in each of areas that are 90° out of phase with respect to two positions of the two ridges which serve as cutting portions when the tapping screw is driven into the prepared hole.

3. The tapping screw according to claim 2, wherein a lead of one ridge of the two threads is set to be equal to or larger than a sheet thickness of the screwed member.

4. The tapping screw according to claim 1, wherein a lead of one ridge of the two threads is set to be equal to or larger than a sheet thickness of the screwed member.

* * * * *